Nov. 18, 1969     H. W. STENGEL     3,478,428
APPARATUS FOR DENTAL MODELS
Filed March 21, 1968
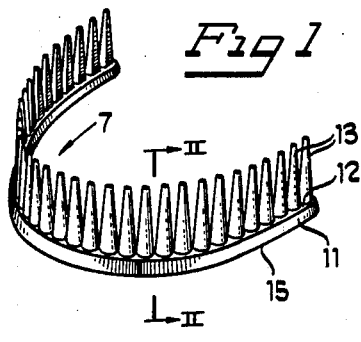
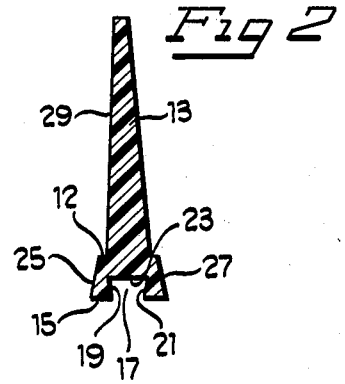
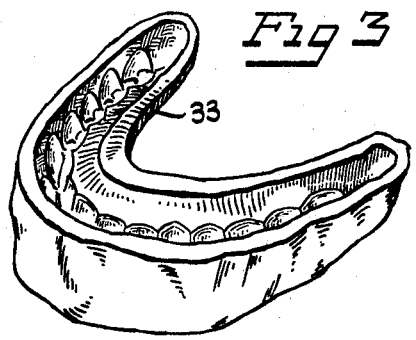
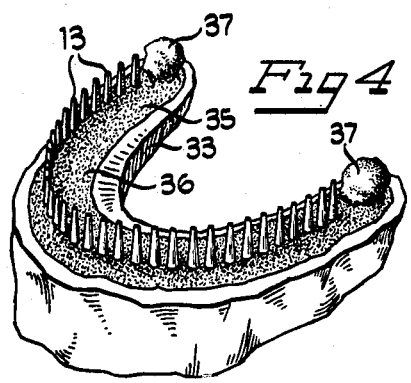
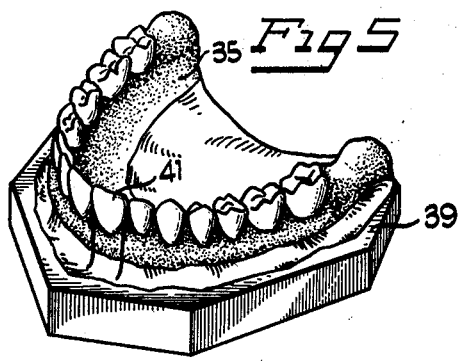
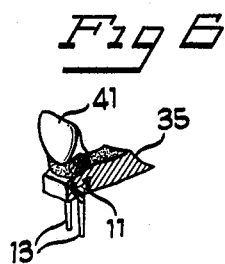
INVENTOR
HEINZ WILLIAM STENGEL
BY *William K. Serp*
ATTORNEY

United States Patent Office 3,478,428
Patented Nov. 18, 1969

3,478,428
APPARATUS FOR DENTAL MODELS
Heinz William Stengel, 7705 Maple Ave.,
Gary, Ind. 46403
Filed Mar. 21, 1968, Ser. No. 715,060
Int. Cl. A61c 13/22
U.S. Cl. 32—11      6 Claims

ABSTRACT OF THE DISCLOSURE

The apparatus includes a single row of parallel oriented conically shaped teeth or guide pins. The guide pins are secured to and project from one side of an arcuately shaped, elongated retaining base, and the surface of each pin which is disposed toward the radius of curvature of the retaining base is flattened. The surface of the retaining base is developed so as to insure a permanent bond with the dental stone cast thereabout. In use, the apparatus is seated within a dental impression with the base thereof disposed toward and firmly seated within the impression. The various die stones forming the model are poured, and, after the model has hardened, a thin saw blade or other suitable cutting instrument is used to separate the model between the margins of the selected die or dies to be removed. The cut is made sufficiently deep to assure severing the retaining base. Thereafter, the cast tooth can easily be removed. The pins which project from the lower surface of the die serve as guide members for the die and assure proper orientation with respect to the remaining teeth when the die is replaced in the model.

Background of the invention

This invention generally relates to a method and apparatus for use in the practice of restorative dentistry and more particularly relates to a method and apparatus for the construction of improved dental models.

Occasionally during the practice of restorative dentistry, the practitioner considers it advisable to construct a bridge or an inlay to replace all or a portion of a decayed dentition or to improve the occlusion of a patient's teeth. As a preparatory step in the preparation of such bridges and inlays, several impressions are generally made of the patient's jaw. Frequently, an upper and a lower, as well as an occlusion impression are prepared. The impression may be prepared of a rubberized material such as agar hydrocolloid which is then washed and placed in a potassium sulfate bath. The denture section of the model is cast by pouring a die stone, such as calcium sulfate hemihydrate, into the impression. The die stone is then spatulated under vacuum with the aid of heavy vibrations so as to reduce the air space in the stone, thereby assuring that the model will display a smooth, dense surface.

To facilitate removal of selected teeth from the cast model, a single dowel pin is accurately placed in the liquified dental die stone prior to setting thereof. Conventional dowel pins often display the shape of a needle, the base of which is flared or expanded to assure adequate bonding with the hardened dental stone. In accordance with conventional practice, the base of the dowel pin is preferably seated as close as possible to the center of the impression of the tooth to be removed. To prevent binding of the pin with the base of the model thus inhibiting removal of the tooth, the longitudinal axis of the dowel pin is held along a line parallel to the axis of the tooth during setting of the die stone. Since the die stone is normally opaque, alignment marks are frequently inscribed upon the impression. The proper positioning of the dowel pin in the model is particularly critical and tedious, since improper positioning may result in the construction of an unusable model.

Summary of the illustrated embodiment

In accordance with the illustrated embodiment, the arcuately shaped retaining base of an alignment core is positioned within the recesses of a dental impression. The retaining base is developed to assure a firm bond with the die stone, as will hereinafter be further described. A plurality of parallel oriented, conically shaped pins are arranged in a single row and are secured to the retaining base so that they extend outwardly from the impression. The die stone is poured to a level sufficient to fill the cavities of the impression, and the alignment core is placed within the poured stone to a level sufficient to completely cover the retaining base. The pins protrude from the poured die stone. After the stone has hardened, the exposed surface thereof is coated with a suitable separating medium, and the dental stone forming the base of the model is poured. After thorough hardening, the model is removed from the impression. The model may be cut with a thin saw blade or other suitable means between the margins of the teeth which are to be removed. The cut is made to a depth sufficient to sever the retaining base, as well as that portion of any pin which may be spanning the margin area. The die of the desired tooth may then readily be removed from the model; and, as a result of the particular construction of the core, the longitudinal axis of the needles imbedded within the die will be substantially parallel to the axis of the die thereby assuring removal from and reinsertion into the model.

The main object of this invention is to provide an improved apparatus and method for the construction of dental models. Other objects and advantages of the invention will become apparent with reference to the following description and accompanying drawing which show an illustrative embodiment of this invention.

Brief description of the drawing

FIGURE 1 is a preferred embodiment including certain features of this invention.

FIGURE 2 is a sectional view taken along the line II—II of FIGURE 1.

FIGURE 3 is a perspective view of a conventional dental impression prior to pouring of the die stone and placing of the apparatus of FIGURE 1 therein.

FIGURE 4 is a perspective view of the impression of FIGURE 3 with the dental stone poured and the apparatus of FIGURE 1 suitably positioned.

FIGURE 5 is a perspective view of a completed dental model with the impression removed.

FIGURE 6 is a perspective view of the cast of the first incisor forming a portion of the model of FIGURE 5.

Description of the preferred embodiment

With reference in particular to FIGURES 1 and 2, an alignment core 7 is illustrated which comprises an elongated, curved retaining base 11. The base 11 includes an upper face 12 to which is secured a single row of parallel oriented, conically shaped guide pins 13. The retaining base 11 is shaped so as to display an arcuate configuration similar to that of the curvature of the human dentition.

A lower face 15 of the retaining base 11 opposite the face 12 from which the pins project is provided with a continuous recess or channel 17 defined by side walls 19 and 21 and an upper wall 23. The plane of the upper wall 23 is generally parallel to the plane of the upper face 12. Serving to provide a better grip with the dental stone when cast therein, the side walls 19 and 21 are tapered so that the cross-sectional shape of the channel 17 is in the form of an inverted trapezoid with the base thereof corresponding to the upper wall 23. Similarly, side surfaces 25 and 27 forming the outer walls of the retaining base 11 are tapered so that the general cross-sectional area of the retaining base also displays a trapezoidal shape with the base of the trapezoid corresponding to the lower face 15. The tapered configuration of the side walls of the channel 17 and the outer walls of the retaining base 11 serves to assure positive bonding of the alignment core with the tooth portion of the model, as will subsequently become more evident.

As previously mentioned, the alignment core 7 includes a row of equally spaced, conically shaped guide pins 13 the bases of which are secured to the upper face 12 of the retaining base. For reasons to be hereinafter further considered, the spacing between the axis of each of the pins is preferably slightly less than half the width of an average human tooth so as to insure that at least one complete pin will be imbedded with each tooth. As previously mentioned, each of the guide pins 13 is conically shaped with the base of the core adjacent the retaining base 11. To prevent rotational movement of the severed tooth when positioned within the model, one surface of each of the pins is flattened, as at 29.

The alignment core 7 illustrated in FIGURE 1 may be constructed of any suitable rigid material. However, it has been found that a plastic which may easily be cut and which also may be reformed upon the application of heat is particularly suitable. The reforming feature of plastic is particularly desirable, since it permits the radius of curvature of the retaining base to be altered so that it may be more readily conformed to the particular shape of the impression.

The alignment core is particularly adapted to facilitate the construction of a dental model. With reference to FIGURE 3, a dental impression 33 is made of the patient's jaw in the conventional manner. Agar hydrocolloid or other suitable material may be used for the impression material. For purposes of discussion, the impression illustrated is that of the entire lower jaw. It should be understood, however, that partial segments of the jaw may be cast. In such situations, it may be desirable to utilize only particular segments of the alignment core illustrated in FIGURE 1.

With particular reference to FIGURE 4, a suitable die stone 35, such as calcium sulfate hemihydrate is poured into the impression. The die stone 35 is spatulated by subjecting it to vibration under vacuum so as to eliminate all air spaces in the stone and to fill all the recesses of the impression so as to provide a smooth, dense surface. After the die stone is poured and spatulated, the core 7 is positioned within the impression so that the retaining base 11 lies along the cavities of the impression and the guide pins 13 project outwardly therefrom. In the event the curvature of the retaining base does not correspond to the natural curvature of the impression, the plastic material from which the core 7 is constructed may be heated slightly and reformed so as to more accurately accommodate the curvature of the impression. The alignment core 7 is positioned to rest within the impression 33 with the lower face 15 of the retaining base 11 preferably being approximately 5 mm. above the ridges defined by the margins of the teeth at the gum line. The die stone covers the upper face 12 of the retaining base 11 and the pins 13 project outwardly therefrom.

In accordance with conventional practice, the die stone 35 may be tinted pink or colored as desired. Serving to bond the dental die stone with the base of the model to be subsequently poured are two retaining nuggets 37 formed of die stone positioned at the ends of the impression, as illustrated in FIGURE 4. The die stone is allowed to harden, and the exposed surface is coated with a silicon compound 36 or other suitable lubricant to prevent the hardened die stone from adhering to the base of the model, as will subsequently become more apparent. With reference to FIGURE 5, a base 39 is cast which covers the pins 13 and forms the lower portion of the model. After the base dental stone has hardened, the impression is removed.

Removal of the individual teeth or a group of teeth upon which the work is to be performed is accomplished by completely cutting the die stone 35 between the margins of the selected teeth. Complete severance of the die stone assures that the retaining base 11 of the alignment core 7 will be thoroughly cut. Further, the cut is preferably made well into the base of the model to assure complete severance of any guide pins which may be spanning the margin area. As illustrated in FIGURE 5, a first incisor 41 has been selected for removal and a suitable cut made between the margins of the incisor 41 through the die stone 35 and well into the base of the model. This cut severes the retaining base 11 of the alignment core 7, as well as any pins 13 which may be spanning the margin areas of the incisor. The incisor is then removed. The silicon lubricant 36 prevents adherence between the die stone 35 and the base 39 of the model. Since the pins are constructed of material having a relatively smooth surface, they exhibit very little bonding power with the base of the model permitting easy removal of the tooth therefrom. As previously mentioned, the pins are spaced slightly less than half the width of an average tooth so that at least one complete pin will project from the base of each tooth. Inasmuch as the incisor is a relatively large tooth, two pins are shown associated therewith.

The developed surface of the retaining base 11, previously described, assures that it will be rigidly retained in the base of the tooth. The incisor 41 may then be readily withdrawn and replaced in the model, and the alignment core assures that the tooth will be maintained in proper alignment with respect to the remainder of the model. With respect to the narrower teeth, such as the lower anterior or children's teeth, it has been found that frequently only one pin is aligned with the tooth to be removed. In such situations, the flattened surface 29 of the pin prevents restricted relative rotational movement of the tooth with respect to the model.

The previously described apparatus and method greatly facilitate the construction of dental models eliminating the laborious process of positioning individual dowel pins during the casting of the model.

I claim:

1. An apparatus to facilitate the production of cast dental models comprising an elongated retaining base, a plurality of parallel oriented, elongated pins, one end of each of said pins being secured to a first face of said retaining base, and means associated with said retaining base to assure positive bonding of said base with the portion of the model to be cast thereabout.

2. An apparatus in accordance with claim 1 wherein said retaining base is arcuately shaped, the curvature thereof corresponding to the shape of a human jaw, and wherein said pins are arranged in a single row and are conically shaped, the base of the cone being secured to said first face of said retaining base.

3. An apparatus in accordance with claim 2 wherein said bonding means includes tapered side walls of said retaining base, said side walls tapering inwardly toward said first face.

4. An apparatus in accordance with claim 3 wherein said bonding means further includes an elongated, continuous channel formed along a second face of said retaining base, said second face being opposite said first face, the cross-sectional area of said channel displaying the shape of a trapezoid, the base of said trapezoidal shape being disposed adjacent said first face.

5. An apparatus in accordance with claim 4 wherein a portion of the conical surface of each of said teeth is flattened and wherein the longitudinal axes of said teeth are spaced a distance no greater than the width of an average human tooth.

6. An apparatus in accordance with claim 5 wherein said retaining base is constructed of a plastic material reformable upon the application of heat to facilitate adjustment of the radius of curvature of the retaining base.

References Cited

UNITED STATES PATENTS

| | | | |
|---|---|---|---|
| 179,945 | 7/1876 | Noble | 32—15 |
| 3,277,576 | 10/1966 | Kraft | 32—40 |

ROBERT PESHOCK, Primary Examiner